United States Patent
Cheng et al.

(10) Patent No.: US 7,991,851 B2
(45) Date of Patent: Aug. 2, 2011

(54) REMOTE USER SUBSTITUTION AT ODBC/CLI LEVEL AND STORED PROCEDURE AUTHORIZATION

(75) Inventors: Josephine Miu Cheng, San Jose, CA (US); Chi-Pei Michael Hsing, San Jose, CA (US); Frank Meng, Brea, CA (US)

(73) Assignee: International Business Machines Corporation, Armonk, NY (US)

( * ) Notice: Subject to any disclaimer, the term of this patent is extended or adjusted under 35 U.S.C. 154(b) by 2537 days.

(21) Appl. No.: 10/256,730

(22) Filed: Sep. 27, 2002

(65) Prior Publication Data

US 2003/0163546 A1 Aug. 28, 2003

Related U.S. Application Data

(60) Provisional application No. 60/360,735, filed on Feb. 28, 2002.

(51) Int. Cl.
*G06F 15/16* (2006.01)
*G06F 17/30* (2006.01)
(52) U.S. Cl. .................. 709/217; 709/219; 707/999.003
(58) Field of Classification Search .......... 709/217–220; 707/999.002, 999.003, 999.004, 999.009; 719/313; 726/4
See application file for complete search history.

(56) References Cited

U.S. PATENT DOCUMENTS

| 6,049,787 | A | 4/2000 | Takahashi et al. |
| 6,112,228 | A | 8/2000 | Earl et al. |
| 6,327,629 | B1 * | 12/2001 | Wang et al. .................. 719/313 |
| 6,341,281 | B1 * | 1/2002 | MacNicol et al. ................. 707/3 |
| 6,502,193 | B1 * | 12/2002 | Barber .............................. 726/4 |

FOREIGN PATENT DOCUMENTS

| WO | WO 9914890 | 3/1999 |
| WO | WO 0120484 A2 | 3/2001 |

* cited by examiner

*Primary Examiner* — Peling A Shaw
(74) *Attorney, Agent, or Firm* — Sawyer Law Group, P.C.

(57) ABSTRACT

A system and method for interfacing a portable electronic device, having a plurality of commands including a plurality of resource commands and a plurality of local commands, with a remote resource over a costed communications channel includes processing the plurality of commands on the device without communicating any of the resource commands over the channel to the remote resource while aggregating the resource commands to produce a set of resource commands; communicating the set of resource commands to the remote resource over the channel to produce a resource output responsive to the set of resource commands; communicating the resource output to the device from the remote resource; and processing the resource output on the device using the set of local commands.

18 Claims, 4 Drawing Sheets

FIGURE_1

REMOTE USER SUBSTITUTION AT ODBC/CLI LEVEL AND STORED PROCEDURE AUTHORIZATION

CROSS REFERENCE TO RELATED APPLICATION

This application is claiming under 35 USC 119(e) the benefit of provisional patent application Ser. No. 60/360,735 filed on Feb. 28, 2002.

FIELD OF THE INVENTION

The present invention relates generally to remote access to resources on a computer system, and more specifically to remote access over a communications channel that may be unreliable or have a significant or chargeable usage cost.

BACKGROUND OF THE INVENTION

Remote access to resources on a computer system is becoming increasingly more important as personal digital assistants (PDA) and other portable electronic devices such as laptop computer systems gain popularity. The remote shared resources include, for example, databases, documents, applications, stored procedures, processes, routines, files, physical and virtual devices, memory, and other addressable or accessible information on a computer system.

Traditionally, remote access was implemented over hardwire network connections using Ethernet or Token Ring protocols. Recently, wireless communications channels are used to supplement or replace the hardwire connections. These wireless communications channels may use infrared and radiofrequency (RF) signals.

The wireless connection model has been extended to the PDAs and other portable electronic devices to enable connection from the PDA to a remote resource (remote in the sense it is not located on the same physical device, though it may be a central or shared resource as described above).

The drawbacks to the use of a wireless connection model for accessing a shared remote resource by a remote device can include: 1) unreliable connections, 2) expensive connections, 3) insecure connections, and 4) complicated connections.

The connections may be unreliable because of various well-known deficiencies in wireless connection systems, including adequate power and proximity of receivers and transmitters in appropriate relationship to each other. This drawback is further complicated because the PDA location relative to an active and accessible transceiver may be changing between connections or even during a connection. An access to a resource may be possible at one instant, but may be inaccessible soon thereafter. If a resource is inaccessible, a user or application of the PDA cannot necessarily know when a connection will be possible, or become possible again. This can cause anomalous behavior with applications not properly designed for this contingency, as well as increase user frustration when trying to access a shared resource that is intermittently available.

The connections may be expensive because many wireless service providers will charge a user based upon the number of connections initiated and the length of each connection. As some service providers charge the user a minimum amount for any connection no matter how short, frequent connections that use very little time can result in a very high charge that is not related to the actual amount of time the connection was used. Therefore this connection model results in a usage fee that is unnecessarily large given the actual amount of data transmitted and connection time attributed to the user.

The connections may be insecure because transmitters and receivers are necessarily non-discriminatory at the connection level. A wired network gains some security by limiting access to the connection medium, but wireless systems are unable to be secured in a similar fashion. As a further complication, transmissions are necessarily broadcast and may be received by unauthorized receivers that can lead to a compromise of access information.

There are many ways to develop database applications. One common and efficient way on Win32 platforms is to use ActiveX Data Controls with a GUI builder like Visual C++ or Visual Basic. Applications built this way sometimes don't require a single line of coding. IBM DB2 Everyplace also has a GUI builder "Mobile Application Builder" (MAB) that allows rapid application development for wireless platforms, e.g. the Palm platform.

This model has a major drawback in the Client/Sever environment. For each client to connect to a remote Database Server like IBM Universal DB (UDB), the client needs to supply a UserID/password with an ODBC/CLI SQL-Connect( ) function. The same UserID/password also needs to be created on the server machine. This exposes a potential security problem by permitting users to have authentication information that directly logons to the Database Server or the underlying operating system, particularly because most systems do not permit the encryption of this UserID/password credential.

A consequence is that many industrial strength Client/Server applications have to avoid using these rapid Database Access GUI builders. Application builders move their database access code to a mid-tier server. Their GUI clients pass their proprietary authentication information to the mid-tier server. The mid-tier server then uses the Database Server UserID/password to access the data. IBM Content Management System Administration tool is one of the examples.

Additionally, an industrial strength Database Server like UDB offers authorizations at instance-level, database-level, and table/view level. Currently one feature not fully implemented is providing authorization at the stored procedure level.

As seen above, the wireless connection model can lead to complicated connections in that configuration files typically must be established on both the PDA and on the system hosting the shared remote resource. Coordinating the files with proper, current and complete authorization information can be difficult, particularly when the remote shared resource is administered by a different entity than that responsible for administering the PDA.

Accordingly, what is needed is a system and method for simply and efficiently accessing a shared remote resource from a PDA using a wireless connection that improves reliability and security while reducing cost and complexity. The present invention addresses such a need.

SUMMARY OF THE INVENTION

A system and method for interfacing a portable electronic device, having a plurality of commands including a plurality of resource commands and a plurality of local commands, with a remote resource over a costed communications channel includes processing the plurality of commands on the device without communicating any of the resource commands over the channel to the remote resource while aggregating the resource commands to produce a set of resource commands; communicating the set of resource commands to the remote resource over the channel to produce a resource output responsive to the set of resource commands; communicating the resource output to the device from the remote resource; and processing the resource output on the device using the set of local commands. The system and method includes accessing a remote resource using open database connectivity (ODBC) commands by constructing an ODBC instruction for the remote resource, the ODBC instruction including unencrypted database access information and the ODBC instruction having an associated user credential; issuing the ODBC instruction to a user substitution agent that qualifies the ODBC instruction using the user credential and the ODBC instruction, the user substitution agent having an associated agent credential; and issuing, from the agent, a data store access command to the data store using the agent credential when the user credential is authorized to process the ODBC instruction. Instead of an ODBC database, the system and method may perform a user qualification and substitution for a stored procedure call as a remote shared resource.

The present invention efficiently improves reliability and security while reducing cost and complexity. Reliability is improved by, among other reasons, communicating resource commands to a remote shared resource at one time, such as when a communications channel is available. One way in which security is improved is by providing agent substitution/qualification based upon a user credential and a particular application or process. Cost is reduced, for example, by aggregating remote commands and communicating several during a single connection event instead of opening and closing a communications channel multiple times. Complexity is reduced in several ways, including dispensing with respective configuration files on both a remote unit and a shared system and managing authorized permissions in conjunction with configuration of a shared resource.

DETAILED DESCRIPTION

The present invention relates generally to remote access to resources on a computer system, and more specifically to remote access over a communications channel that may be unreliable or have a significant or chargeable usage cost. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
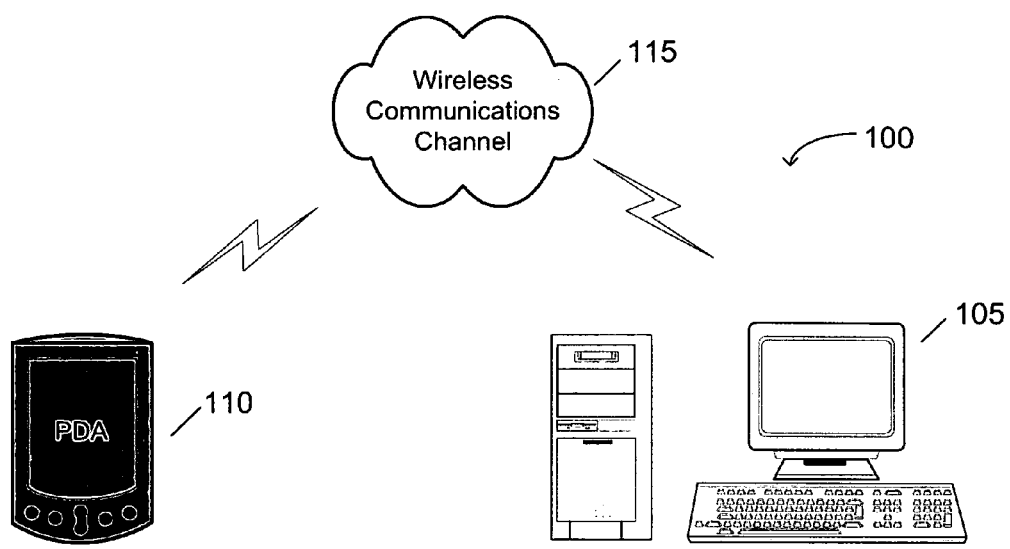
FIG. 1 is a block schematic diagram of a preferred implementation environment for the present invention.

FIG. 1 is a block schematic diagram of a preferred implementation environment 100 for the present invention, including a general purpose computer system 105 communicating with a portable electronic device 110 (e.g. a personal digital assistant (PDA)). In the preferred embodiment, computer system 105 and device 110 communicate with each other over a wireless communications channel 115, though other costed communications channels may be employed. The term costed refers to an attribute of the communications channel in which a user is charged for use of the channel or there is an otherwise non-trivial cost (currency, time or other resource use) associated with use of the channel, or it is a reference to a channel that is not guaranteed to be available such as a wired LAN or WAN.

The general constructions of computer system 105 and device 110 are well-known, each typically including a central processing unit (CPU) or microprocessor unit (MPU) interconnected by one or more internal buses to computer subsystems (e.g., memory, I/O (keyboard, mouse, monitor, for example), communication systems (modem and network, for example), and storage units (volatile and non volatile, and fixed or removable, of many different types). Computer system 105 and device 110 typically operate under program control, the program most commonly stored on non-volatile computer readable media, such as for a hardfile (e.g. a hard drive or a read-only memory (ROM)). The programs, and the set of instructions, are executable by computer system 105 or device 110 to perform the identified procedures of the code. The particular selection and configuration may vary widely depending upon many different factors.

The present invention is adaptable to many different kinds of portable electronic devices and computer systems for many different uses, so the specific details of computer system 105 or device 110 are not shown but described in very general fashion. A common factor among general-purpose computer systems 105 and device 110 is that an operating system and user data and application software are installed and accessed from the hardfile. In most cases, the hardfile is physically integrated with computer system 105 and device 110. In other instances, the hardfile may be physically removed or distinct from computer system 105 and device 110. For example, the hardfile may be connected to computer system 105 or device 110 by a local area network (LAN) or wide-area network (WAN). In some cases, the hardfile may include removable media such as a floppy disk or magneto-optic removable media.

In these various configurations, the hardfile includes non-volatile memory for storing an operating system used by computer system 105 and device 110, and typically user data and application software. Most commonly, the hardfile of computer system 105 is a fixed hard drive storing the information on magnetic media. Computer system 105 includes a harddrive adapter for controlling the storage and retrieval.

Figure 2:
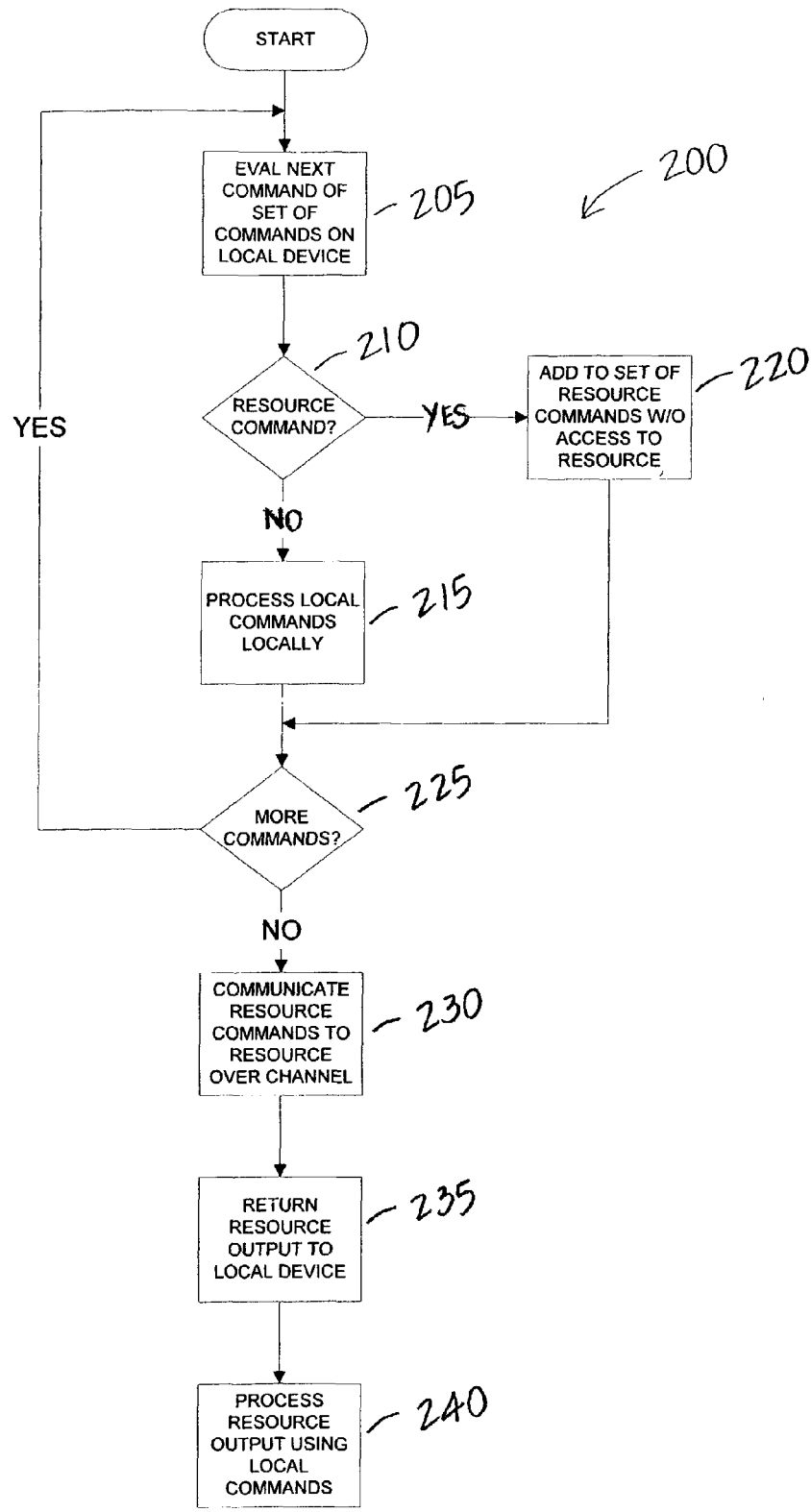
FIG. 2 is a flowchart of a preferred embodiment of the present invention.

FIG. 2 is a flowchart of a preferred connection process 200 of the present invention as implemented on device 110 illustrated in FIG. 1. Device 110 includes one or more processes that include a plurality of commands. The plurality of commands include a plurality of local commands and a plurality of resource commands for interaction with one or more resources on computer system 105. The resources can include a data store (e.g. a database or file), an application or process, memory contents or application output, or other remote accessible feature of computer system 105. Device 110, at step 205, evaluates a next command of the plurality of commands. Device 110, at step 210, tests the next command to determine whether it is a resource command. If step 210 tests no, device 110 processes the local command locally at step 215. However, if step 210 tests yes, device 110 processes step 220 and aggregates the resource command into a set of resource commands on device 110 without accessing the resource on computer system 105.

After step 215 for a non-resource command and after step 220 for resource commands, device 110 processes step 225 to test whether there are unevaluated commands in the plurality of commands. When one or more commands are unevaluated, device 110 iterates through steps 205 through 225 until no unevaluated commands remain. When the test at step 225 tests negative, device 110 advances to step 230 to communicate the set of aggregated resource commands from step 220 to the resource made available on computer system 105. In the preferred embodiment the entire set of aggregated resource commands are communicated to the resource over the communications channel 115.

At step 235, computer system 105 interacts the set of resource commands with the resource and system 105 returns the resource response or output to device 110 over the communications channel. In the preferred embodiment when the resource is a structured query language (SQL) database and the set of resource commands are SQL commands such as SQLExecute( ), step 235 applies all the resource commands that can only be executed against the resource on computer system 105.

Device 110 will then execute step 240 to process the resource response/output using the rest of the plurality of commands including the local commands. After completing step 240, device 110 completes the preferred embodiment and achieves the same result had the plurality of commands been executed in sequence with numerous connections and command/output data exchanges being made between device 110 and computer system 105. The preferred embodiment achieves the result by using the communications channel fewer times than conventional implementations which reduces costs of usage of the channel and improves reliability as a fewer number of connection events means that a failure of the communications medium will have a reduced effect.

Computer system 105 may return a relatively large dataset to device 110, and typically the size is larger than the dataset that would have been returned had the plurality of commands been executed in order against the resource. For example for the database example, the preferred embodiment returns a superset of the ultimately used data and device 110 caches the superset locally and executes the local commands locally to achieve the desired dataset. If device 110 had been allowed to operate in conventional fashion with a plurality of connection and communication events over the communications channel, computer system 105 would have returned the final dataset rather than the superset.

Figure 3:
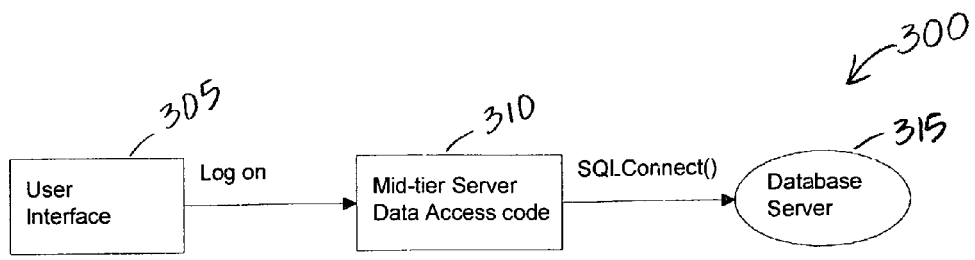
FIG. 3 is a block schematic diagram of a conventional ODBC connection model.

FIG. 3 is a block schematic diagram of a prior art solution to a conventional ODBC connection model 300. Connection model 300 includes a user interface 305 having associated user credentials (typically a user id and related password), a mid-tier server access code 310 to issue database commands to a database server 315. In the prior art prior to connection model 300, user interface 305 would have connection information directly into database server 315. In order to avoid the security problem, connection model 300 separates the User Interface and Data Access code into two tiers. Separating these into two tiers as shown prohibits them from using the rapid data access GUI builder tools because these tools would generate both "user interface" and "data access" code together as one tier.

Figure 4:
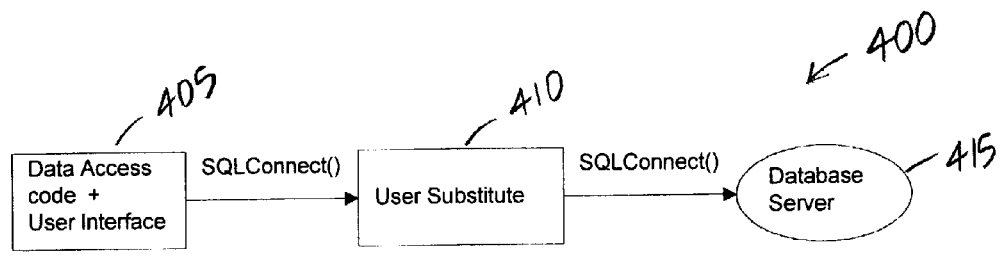
FIG. 4 is a block schematic diagram of an agent-for-user substitution model.

FIG. 4 is a block schematic diagram of an agent-for-user substitution model 400 that overcomes the disadvantages of connection model 300 shown in FIG. 3 by being able to be coded using rapid data access GUI builder tools. Agent-for-user substitution connection model 400 includes a data access code and user interface 405 for issuing a SQLConnect( ) command to a user substitute 410 that in turn reissues the SQLConnect( ) command to a database server 415. In connection model 400, user interface 405 issues the SQLConnect( ) with associated user credentials. User substitute 410 evaluates the SQLConnect( ) command from user interface 405 in connection with associated permissions and context and qualifies the SQLConnect( ) session. If authorized, user substitution 410 passes the SQLConnect( ) and related commands on to database server 415 with user substitute credentials instead of user credentials. Database 415 may return the data to user substitute 410, directly to user 405 or to an identified third party or third party process depending upon implementation preferences.

Connection model 400 is preferable to connection model 300 in that the database connection information is hidden from the user interface and an application builder may use the rapid GUI builder tools to create the connection pieces. Additionally, connection model may be implemented on device 110 shown in FIG. 1.

Figure 5:
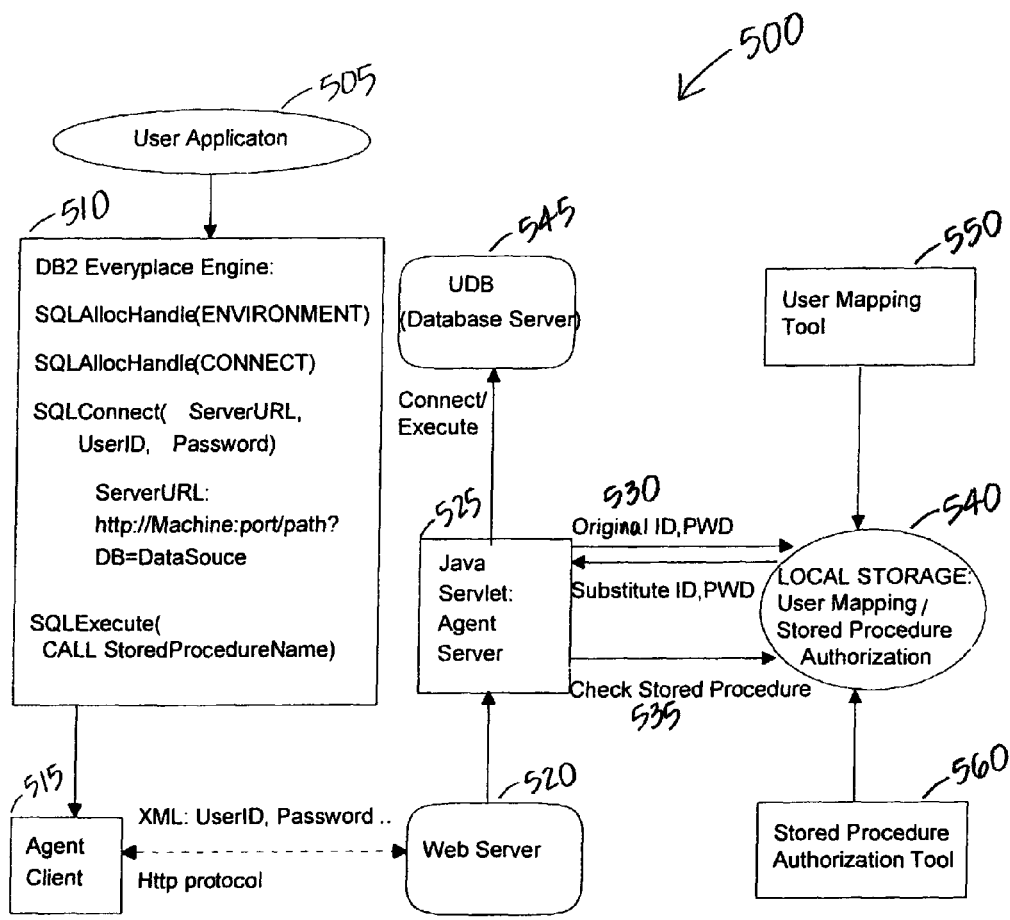
FIG. 5 is a block schematic diagram for a preferred implementation of the present invention.

FIG. 5 is a block schematic diagram for a preferred implementation of the present invention for a system 500 on device 110 that implements process 200 shown in FIG. 2, the agent-for-user substitution connection model 400 shown in FIG. 4 and a connection model that can be used to perform agent substitution for stored procedure calls.

System 500 includes a user application 505, a database engine 510 for device 110, an agent client 515 in communication with a web server 520, a server applet 525 (e.g., a java servlet agent server) that processes credentials 530 (e.g. original ID/password and receives substitute id/password) and checks stored procedure requests 535 against a local storage 540 for access to a database server 545. A user mapping tool 550 and a stored procedure authorization tool 560 both interface to local storage 540 to set user mapping and stored procedure authorization permissions.

User application 505 executes on device 110 and periodically makes use of database engine 510 also locally present on device 110. Database engine 510 is preferably a database that is tuned for operation with portable electronic device 110, such as DB2 Everyplace available from IBM. DB2 Everyplace includes a database engine that is SQL compliant and processes commands such as SQLAllocHandle( ), SQLConnect( ), SQLExecute( ) and other SQL commands. Database engine 510 is adapted to recognize databases as being local to, or remote from, device 110 by use of a SQLConnect having parameters of ServerURL, UserID and Password. When the ServerURL points to a database not resident on local device 110, agent client 515 on device 110 preferably executes process 400.

Agent client 515, also preferably executing on device 110, handles communications between user application 505 and web server 520, and receives resource commands and parameters (e.g. ServerURL, UserID, and Password) from user application 505 or process 510 and sends them to web server 520.

In the preferred embodiment, web server 520 is a process on computer system 105 that communicates with agent client 515 using a standardized data description language such as XML (extensible markup language). Client 515 and web server 520 exchange information using XML. Server applet 525 is a process on web server 520 and responds to the resource commands and parameters sent from client 515. Server applet 525 responds to commands that require a User ID/Password by qualifying the request and sending the original UserID/Password to local storage 540 and receiving a substitute UserID/Password. Local storage 540 maps a particular UserID/password to a substitute UserID/Password and returns the information to server applet 525. Server applet 525 uses the substitute UserID/password to access database server 545 with the resource commands instead of using the UserID/password. Preferably database server 545 will return data to the user application through agent server 525, web server 520, agent client 515 and process 510 using XML as appropriate and convenient to the particular implementation.

In the case that the process 510 uses a SQLExecute (CALL StoredProcedureName), agent server 525 receives the command from client 515 through web server 520 and qualifies the access based upon a query into local storage 540. In the preferred embodiment, local storage 540, database server 545, user mapping tool 550 and stored procedure authorization tool 560 are resident on computer system 105, but this configuration is not required in all implementations.

When a stored procedure is written in embedded SQL (which is an unpopular way to develop database application and requires pre-compiling to generate package,) then an Administrator is able to grant users EXECUTE privilege on a stored procedure's package. Configuration of system 500 is performed prior to execution of client applications on device 110. An administrator uses a "User mapping tool" to map UserID/password sent from the client machine to Database Server UserID/password. The result is saved in local storage 540. The Administrator uses Stored Procedure Authorization tool 560 to specify the stored procedures that specific users or groups of users are authorized to invoke. The permissions for stored procedure invocation are also saved in local storage 540.

In operation, user application 505 uses standard ODBC/CLI functions to connect to remote UDB database 545 and calls a Stored Procedure to implement database functionality. Process 510 receives information from application 505 and client 515 packages resource commands (e.g. SQLConnect( ) and SQLExecute( )) into an XML document and sends it to web server 520 using http protocol.

Web server 520 starts and passes the XML document to server applet 525. Server applet 515 parses the XML document to retrieve the user and stored procedure information from client 515. Server applet 525 retrieves the list of authorized stored procedures from local storage 540 according to user information. Local storage 540 returns error if the called stored procedure is not part of the list or access by the associated credentials is otherwise unauthorized.

Server applet 525 retrieves the substitute UserID/Password from local storage 540 according to the user credential information in the XML document and uses the substitute UserID/Password as the access ID/password for UDB 545. Server applet 525 connects to UDB 545 using the substitute UserID/password then invokes any authorized stored procedure as indicated in the user SQLExecute( ) command and authorized by permissions set in local storage 560. UDB 545 returns the result of the stored procedure execution/database query to local device 110 directly or by use of server applet 525. It is a feature of the present invention that access to shared resources through web server 520 using the preferred embodiment do not require use of local configuration files (local to device 110) in addition to configuration of local storage 540, thus simplifying connections.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for interfacing a portable electronic device with a remote resource over a costed communications channel, the portable electronic device having a plurality of commands including a plurality of resource commands and a plurality of local commands, the method comprising:
   aggregating at least a portion of the plurality of resource commands to produce a set of resource commands in the portable electronic device without accessing the remote resource; and
   communicating the set of resource commands to the remote resource over the costed communications channel to produce a resource output responsive to the set of resource commands.

2. The method of claim 1, further comprising:
   communicating the resource output to the portable electronic device from the remote resource; and
   processing the resource output on the portable electronic device using the set plurality of local commands.

3. The method of claim 1, wherein the remote resource is a data store, the plurality of resource commands are data store commands, and the resource output is a set or data.

4. The method of claim 3, wherein the data store is a database and the plurality of commands are database commands.

5. The method of claim 4, wherein the database is a structured query language (SQL) database and the plurality of database commands include a plurality of SQL commands.

6. The method of claim 5, wherein the plurality of SQL commands include SQL(CONNECT).

7. A computer usable storage medium having a computer readable program for remote access by a remote computer system to a shared resource over a communications channel, the remote computer system having a plurality of commands including a plurality of resource commands and a plurality of local commands, the computer readable program comprising program instructions for:
   causing the remote computer system to process the plurality of commands on the remote computer system without communicating any of the plurality of resource commands over the communications channel to the shared resource while aggregating the plurality of resource commands to produce a set of resource commands; and
   communicating the set of resource commands to the shared resource over the communications channel to produce a resource output responsive to the set of resource commands.

8. A program storage device readable by a machine, tangibly embodying a program of instructions executable by the machine to perform a method for remote access by a remote computer system to a shared resource over a communications channel, the remote computer system having a plurality of commands including a plurality of resource commands and a plurality of local commands, the method comprising;
   processing the plurality of commands on the device remote computer system without communicating any of the plurality of resource commands over the communications channel to the shared resource while aggregating the plurality of resource commands to produce a set of resource commands; and
   communicating the set of resource commands to the shared resource over the communications channel to produce a resource output responsive to the set of resource commands.

9. The computer usable storage medium of claim 7, wherein the computer readable program further comprises program instructions for:
- communicating the resource output to the remote computer system from the shared resource; and
- processing the resource output on the remote computer system using the plurality of local commands.

10. The computer usable storage medium of claim 7, wherein the shared resource is a data store, the plurality of resource commands are data store commands, and the resource output is a set of data.

11. The computer usable storage medium of claim 10, wherein the data store is a database and the plurality of commands are database commands.

12. The computer usable storage medium of claim 11, wherein the database is a structured query language (SQL) database and the plurality of database commands include a plurality of SQL commands.

13. The computer usable storage medium of claim 11, wherein the database is a structured query language (SQL) database and the plurality of database commands include a plurality of SQL commands.

14. The program storage device of claim 8, wherein the method further comprises:
- communicating the resource output to the remote computer system from the shared resource; and
- processing the resource output on the remote computer system using the plurality of local commands.

15. The program storage device of claim 8, wherein the shared resource is a data store, the plurality of resource commands are data store commands, and the resource output is a set of data.

16. The program storage device of claim 15, wherein the data store is a database and the plurality of commands are database commands.

17. The program storage device of claim 16, wherein the database is a structured query language (SQL) database and the plurality of database commands include a plurality of SQL commands.

18. The program storage device of claim 17, wherein the plurality of SQL commands include SQL(CONNECT).

* * * * *